(12) United States Patent
Colak et al.

(10) Patent No.: US 10,742,136 B2
(45) Date of Patent: Aug. 11, 2020

(54) DC OFFSET COMPENSATION IN MODULAR MULTILEVEL CONVERTER

(71) Applicant: ABB Schweiz AG, Baden (CH)

(72) Inventors: Ilknur Colak, Regensburg (CH); Xinhua Ke, Windisch (CH)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/500,895

(22) PCT Filed: Apr. 5, 2017

(86) PCT No.: PCT/EP2017/058046
§ 371 (c)(1),
(2) Date: Oct. 4, 2019

(87) PCT Pub. No.: WO2018/184669
PCT Pub. Date: Oct. 11, 2018

(65) Prior Publication Data
US 2020/0153359 A1 May 14, 2020

(51) Int. Cl.
*H02M 7/49* (2007.01)
*H02M 7/483* (2007.01)
*H02M 7/48* (2007.01)

(52) U.S. Cl.
CPC .............. *H02M 7/483* (2013.01); *H02M 7/49* (2013.01); *H02M 2007/4803* (2013.01); *H02M 2007/4835* (2013.01)

(58) Field of Classification Search
CPC .................. H02M 2007/4835; H02M 7/49
(Continued)

(56) References Cited

U.S. PATENT DOCUMENTS 5,091,942 A 2/1992 Dent
7,830,682 B2 11/2010 Zhang et al.
(Continued)

FOREIGN PATENT DOCUMENTS

| DE | 4013171 A1 | 10/1990 |
| EP | 3 142 241 A1 | 3/2017 |
| EP | 2 579 442 B1 | 8/2017 |

OTHER PUBLICATIONS

International Preliminary Report on Patentability dated Jun. 28, 2019 for Application No. PCT/EP2017/058046.
(Continued)

*Primary Examiner* — Gary A Nash
(74) *Attorney, Agent, or Firm* — Slater Matsil, LLP

(57) ABSTRACT

In a method of compensating for a DC offset of a high-voltage AC output from a Modular Multilevel Converter (MMC) including at least one phase leg, the MMC is connected to a three-phase high-voltage AC grid via a grid transformer. The method includes, in at least one DC offset correcting device, measuring the DC offset by in each of the at least one DC offset correcting device: obtaining a high-voltage AC signal in the MMC, removing high-voltage AC components from the obtained high-voltage AC signal by means of a passive higher-order filter to obtained an analogue filtered signal, converting the analogue filtered signal to a digital signal by means of an analogue-to-digital converter, removing remaining AC components from the digital signal by means of a digital filter to obtain the DC offset, and in a controller comparing the obtained offset with a reference value and forming a control signal based on said comparing. The method also includes transmitting the control signal from each of the at least one DC offset correcting device to a control device of the MMC. The method also includes, the control device mapping the control signal(s) from the at least one DC offset correcting device to the at least one phase leg.
(Continued)

The method also includes, based on the mapping, the control device sending switching commands to the semiconductor switches of MMC cells in each of the at least one phase leg to compensate for the DC offset.

20 Claims, 6 Drawing Sheets

(58) Field of Classification Search
 USPC .......................... 363/35, 37, 78, 79, 97, 131
 See application file for complete search history.

(56) References Cited

U.S. PATENT DOCUMENTS

| | | | | |
|---|---|---|---|---|
| 9,190,930 | B2* | 11/2015 | Inoue | H02M 1/32 |
| 9,252,684 | B2* | 2/2016 | Inoue | H02M 7/797 |
| 2011/0019449 | A1* | 1/2011 | Katoh | H02M 1/088 |
| | | | | 363/124 |
| 2014/0328093 | A1* | 11/2014 | Zhang | H02M 1/32 |
| | | | | 363/51 |
| 2015/0003134 | A1* | 1/2015 | Trainer | H02J 3/36 |
| | | | | 363/132 |
| 2016/0094117 | A1* | 3/2016 | Hu | H02M 1/32 |
| | | | | 363/51 |

OTHER PUBLICATIONS

International Search Report dated Dec. 21, 2017 for Application No. PCT/EP2017/058046.
Written Opinion of the International Searching Authority dated Dec. 21, 2017 for Application No. PCT/EP2017/058046.

* cited by examiner

DC OFFSET COMPENSATION IN MODULAR MULTILEVEL CONVERTER

TECHNICAL FIELD

The present disclosure relates to a method and device for correcting a Direct Current (DC) offset of a high-voltage (HV) Alternating Current (AC) output from a Modular Multilevel Converter (MMC).

BACKGROUND

In many power electronics applications, transformers are used on one side or both sides of the converter where the voltage amplitude of the grid or the load is different than the converter input and/or output voltages. Intentional or unintentional time lags between the semiconductors in the converters display a certain imprecision in their switching time. Due to this, asymmetric or uneven operation may occur in the converter. This can cause an undesired direct current flowing through the transformer windings. Since either the system feedback cannot sense this direct current without any measurement device or the system is not current controlled, the DC component results in increased magnetization current, saturate the core and increase the heat and therefore the losses of the transformer.

Although, compared with the amplitude of the AC output voltage this DC offset is very small (for example a few volts or fractions thereof), the DC offset can bring the transformer to saturation. This substantially reduces the power to be transmitted, or can even render operation impossible.

Attempts have been made to measure and correct the DC offset by means of high-precision DC current transformers, which are expensive. However, this likewise produced unsatisfactory correction of the offset, and the control was correspondingly complicated and expensive.

U.S. Pat. No. 5,870,297 discloses the use of a low pass filter followed by a DC measuring unit to generate a measuring signal to correct for the DC offset, which may be used for low to medium voltage applications of less than 3.6 kV.

SUMMARY

It is an objective of the present invention to provide a method and device for measuring and compensating for a DC offset current in an output of a high-voltage MMC power converter having an output voltage of more than 3.6 kV, e.g. up to 36 kV.

An output voltage of an MMC comprises a very large (HV) AC component and a very small (e.g. less than 1 V or less than 100 mV) DC component which is herein called the DC offset. In order to properly measure the DC offset, enough of the HV AC component needs to be removed from the output voltage to allow the DC component to be detected and measured. The inventors have now realised that this can be achieved by means of a combination of a passive higher order, i.e. having an order higher than two, filter followed by a digital filter.

According to an aspect of the present invention, there is provided a method of compensating for a DC offset of a high-voltage AC output from an MMC comprising at least one phase leg of at least one AC phase. Each of the at least one phase leg comprises a plurality of cascaded converter cells. Each cell comprises a plurality of semiconductor switches and an energy storage forming an intermediate DC circuit in the cell. The MMC is connected to a three-phase HV AC grid via a grid transformer. The method comprises, in at least one DC offset correcting device of the MMC (1), measuring the DC offset by in each of the at least one DC offset correcting device: obtaining a high-voltage AC signal in the MMC, removing high-voltage AC components from the obtained high-voltage AC signal by means of a passive higher-order filter to obtained an analogue filtered signal, converting the analogue filtered signal to a digital signal by means of an analogue-to-digital converter, removing remaining AC components from the digital signal by means of a digital filter to obtain the DC offset, and, in a controller, comparing the obtained offset with a reference value and forming a control signal based on said comparing. The method also comprises transmitting the control signal from each of the at least one DC offset correcting device to a control device of the MMC. The method also comprises, the control device mapping the control signal(s) from the at least one DC offset correcting device to the at least one phase leg, and, based on the mapping, the control device sending switching commands to the semiconductor switches of the cells in each of the at least one phase leg to compensate for the DC offset.

According to another aspect of the present invention, there is provided an MMC comprising at least one phase leg of at least one AC phase. Each of the at least one phase leg comprises a plurality of cascaded converter cells. Each cell comprises a plurality of semiconductor switches and an energy storage forming an intermediate DC circuit in the cell. The MMC is connected to a three-phase HV AC grid via a grid transformer. The MMC comprises at least one DC offset correcting device configured for measuring the DC offset by in each of the at least one DC offset correcting device: obtaining a high-voltage AC signal in the MMC, removing high-voltage AC components from the obtained high-voltage AC signal by means of a passive higher-order filter to obtained an analogue filtered signal, converting the analogue filtered signal to a digital signal by means of an analogue-to-digital converter, removing remaining AC components from the digital signal by means of a digital filter to obtain the DC offset, in a controller (13), comparing the obtained offset with a reference value and forming a control signal based on said comparing, and transmitting the control signal from each of the at least one DC offset correcting device to a control device of the MMC. The MMC also comprises a control device configured for mapping the control signal(s) from the at least one DC offset correcting device to the at least one phase leg, and for, based on the mapping, sending switching commands to the semiconductor switches of the cells in each of the at least one phase leg to compensate for the DC offset.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Embodiments of the present invention may be used for any type of MMC, having any topology. Herein, a double-why (Y), also called double-star, topology is used as an example, for an MMC between a three-phase AC grid and a single-phase AC grid. Other examples of MMC topologies with which embodiments of the present invention may be used comprise delta-connected MMC and (single) wye-connected MMC.

An MMC conventionally comprises, depending on suitable topology, any number of at least one phase-leg comprising a plurality of series connected (also called cascaded or chain-linked) converter cells. Each converter cell comprises a plurality of semiconductor switches forming e.g. a full-bridge (also called H-bridge) topology for a bipolar cell or a half-bridge topology for a unipolar cell. Each converter cell also comprises an energy storage forming part of what is herein referred to as an intermediate DC circuit. The energy storage may e.g. comprise a battery or, preferably, a capacitor arrangement comprising any number of at least one capacitor.

AC voltages herein are given conventionally as the root-mean-square voltages, which could also be denoted $V_{rms}$ or $V_{AC}$.

Figure 1:
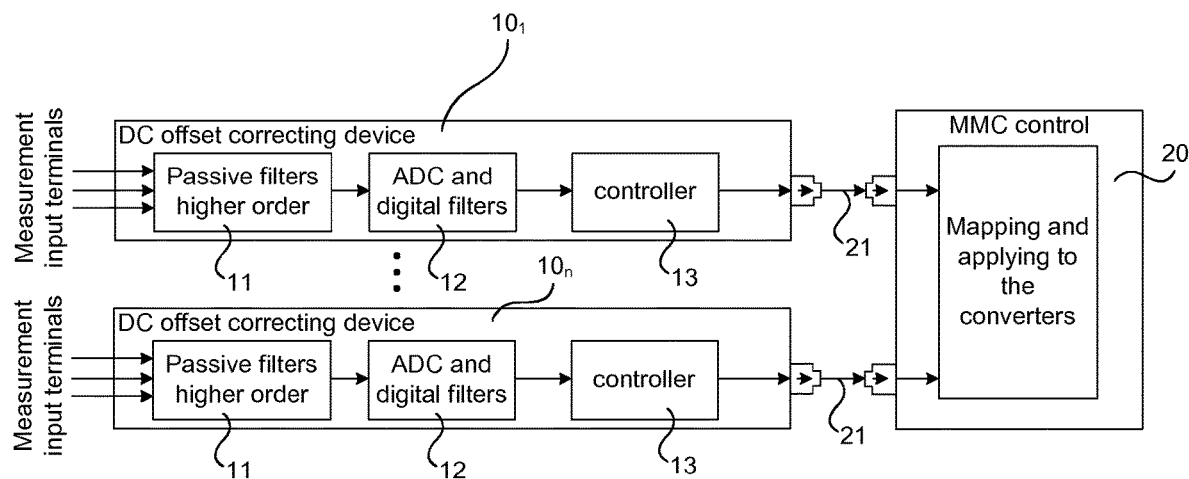
FIG. 1 is a schematic functional block diagram of an embodiment of DC offset correcting devices communicating with a control of an MMC, in accordance with the present invention.

Reference is made to FIG. 1 showing a general outline of a DC offset correcting arrangement comprising a plurality of DC offset correcting devices $10_1$ to $10_n$. An objective of the invention is to provide a solution for suppressing the DC component in the HV output of MMC applications. This is done by measuring DC offset voltages somewhere in the MMC by using a suitable number of DC offset correcting devices 10 (depending on applications), process measured DC offset and apply the outputs of the DC offset correcting devices to the converter phase legs. The method and devices for realising the method should preferably be as simple as possible, be reliable to operate, require minimum external components (such as voltage divider resistors, high voltage cables, insulators, power supply, etc.), to be cheap to implement.

Each DC offset correcting device 10 comprises measurement input terminals for obtaining high-voltages, i.e. HV AC signals, from somewhere in the MMC. The HV AC signal has a voltage ($V_{rms}$) of above 3.6 kV, e.g. of at least 4 kV or at least 10 kV, up to 36 kV, such as within a range of 4-36 kV. The HV AC signals are processed by means of passive higher-order filter(s) ii to remove HV AC components. That the filters are passive implies that they are essentially free from offset. The passive filter may e.g. be a low-pass filter designed to damp components of the HV AC signal above a predetermined cut-off frequency. The passive filter ii may e.g. be designed in the form of a cascade of resistive and capacitive (RC) elements, e.g. a three-stage cascade of RC elements for a third order low-pass filter.

In high-voltage applications, the passive filter(s) ii are not enough to sufficiently remove the AC component of the HV AC signal and obtain the DC offset component of the HV AC signal. Thus, after having applied the passive filter ii, the signal (which is analogue) is converted to a digital signal by means of an analogue-to-digital converter (ADC) and processed by means of digital filter(s) 12. Thus, the AC component is sufficiently supressed to allow sufficiently precise measurement of the DC offset by means of a controller 13. The controller 13 can then compare the measured DC offset with a reference value for said offset, typically zero, and outputs a control signal based on the difference between the measured DC offset and the reference to the control arrangement 20 of the MMC. The controller 13 may e.g. be a P (proportional) controller, and an I (integral) controller or a PI (proportional-integral) controller. Since the DC offset correcting devices 10 may typically be at a different electrical potential than the MMC control 20, the control signalling there between may preferably be performed optically, via optical cables/fibres 21.

The MMC control 20 controls the semiconductor switches of the MMC taking into account the control signals received from the DC offset correcting devices 10, by mapping and applying to the phase-legs of the MMC. This controlling may be done by means of the MMC control 20 being connected to the respective driving circuits of the semiconductor switches of the converter cells of each phase-leg of the MMC. The DC offset may e.g. be corrected by delaying the commands for switching on and off in accordance with the voltage control signals from the DC offset correcting devices 10. If, for example, a positive DC offset is measured, the switches for switching on the positive half wave may be delayed until, as measured over one period, it is no longer possible to determine any DC offset. In the case of a negative DC offset, it is the commands for switching on the negative half wave which may be delayed.

Figure 2A:
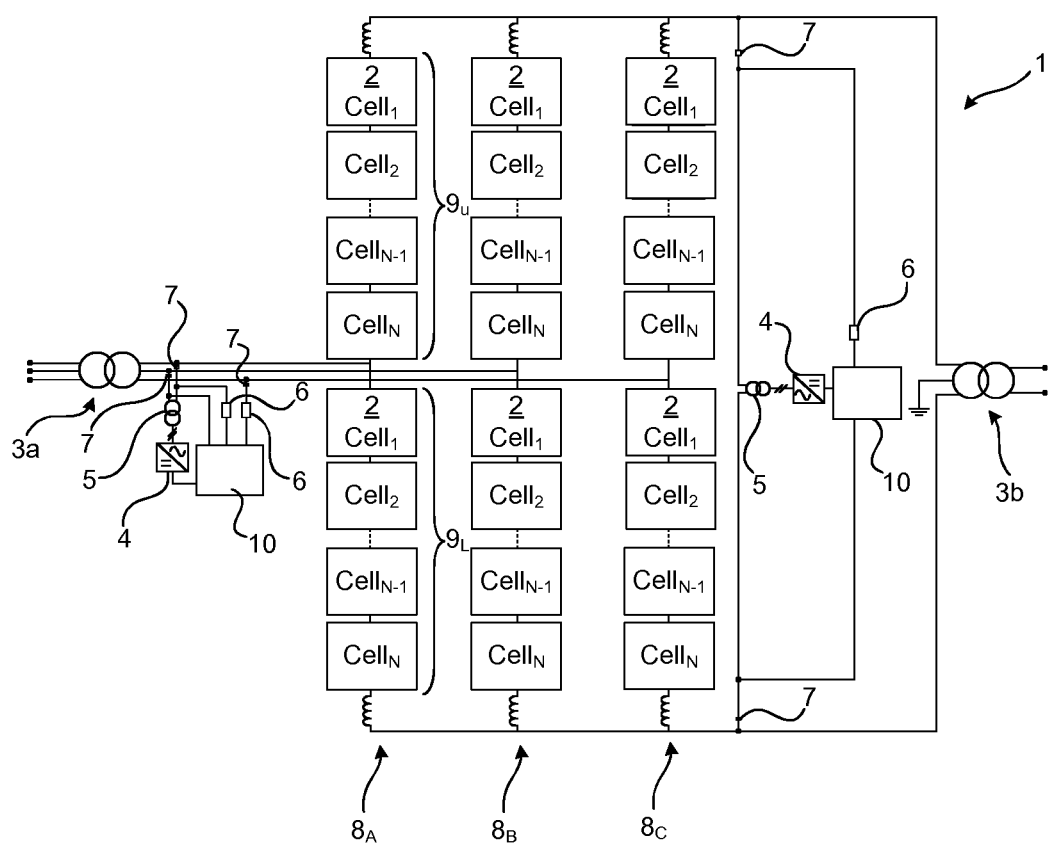
FIG. 2a is a schematic block diagram of an embodiment of an MMC comprising DC offset correcting devices, in accordance with the present invention.

FIG. 2a illustrates an embodiment of an MMC 1 having a double-wye topology of three phases 8 comprising phase-legs 9. Each of the phases $8_A$, $8_B$ and $8_C$ comprises an upper phase-leg $9_U$ and a lower phase-leg $9_L$, making a total of six phase-legs 9 in the MMC. Each phase leg 9 comprises a plurality of N cascaded converter cells 2, as well as a phase-leg reactor (schematically illustrated as a coils in the figure). The MMC 1 is connected between two HV AC grids via respective power transformers 3, a first grid transformer 3a connected to a first HV AC grid on its primary side and to the MMC 1 on its secondary side, and a second grid transformer 3b connected to a second HV AC grid on its primary side and to the MMC 1 on its secondary side. The first HV AC grid is in the example of FIG. 2a a three-phase grid, e.g. a utility grid (e.g. having a fundamental frequency of 50 Hz). The first HV AC grid may have a voltage above 36 kV, such as above 100 kV or above 200 kV, e.g. 220 kV. The second HV AC grid is in the example of FIG. 2a a single-phase grid, e.g. a rail grid (e.g. having a fundamental frequency of 16.7 Hz or 50/3 Hz). The second HV AC grid may have a voltage above 36 kV, such as above 100 kV, e.g. 132 kV, or above 200 kV. As mentioned above, the respective voltages on the secondary sides of the transformers 3a and 3b, i.e. the output voltages of the MMC 1, are above 3.6 kV, e.g. of at least 4 kV or at least 10 kV, up to 36 kV. It should be noted that the respective voltages on the secondary sides of the transformers 3a and 3b (i.e. the MMC output voltages towards the first and second HV AC grids, respectively) do not have to be the same, although they may be the same in some applications. Since the HV phase legs 9 are typically positioned in a valve house, the phase-legs may be connected to the outside of the valve house via bushings 7 through a wall of the valve house.

In the embodiment of FIG. 2a, DC offset correcting devices 10 are connected to the respective output terminals of the MMC 1, one to the three-phase output terminals and one to the single-phase output terminals, via bushings 7 and voltage divider resistors 6, allowing the DC offset correcting devices 10 to obtain its respective HV AC signal from said output terminals. The DC offset correcting devices 10 are powered internally in the MMC via AC-to-DC converters 4 and transformers 5 (e.g. buck transformers), transforming the HV of a respective output terminal to low voltage (LV), e.g. a few hundred volts, such as within the range of 200-500 V, for powering the DC offset correcting device 10. All low voltage equipment may be mounted on an isolated platform and enough required insulation distance is given between the low voltage components and the high voltage equipment.

In the embodiment illustrated in FIG. 2a, a first side of the MMC 1 is connected to a three-phase utility grid via a first grid transformer 3a and a second side of the MMC is connected to a single-phase grid via a second grid transformer 3b. However, many other options for the second side of the MMC 1 may be relevant within the present invention. For instance, the second side of the MMC may be connected to a single-phase HV grid via a line reactor, instead of via a transformer 3b, in which case no DC offset correcting device 10 may be needed at the second side of the MMC. In another example, the second side of the MMC may not be connected to a grid at all, the MMC only being connected to the three-phase HV grid at its first side. In yet another example, the second side of the MMC 1 may be connected to a second three-phase HV grid, typically via a second transformer 3b, whereby the MMC 1 is connected between two different three-phase grids (or possibly between two different points in the same three-phase grid). Of course, the topology of the MMC 1 is adapted accordingly, the double-wye topology used as an example in the figures typically being used when the MMC is connected between a three-phase grid and a single-phase grid.

Figure 2B:
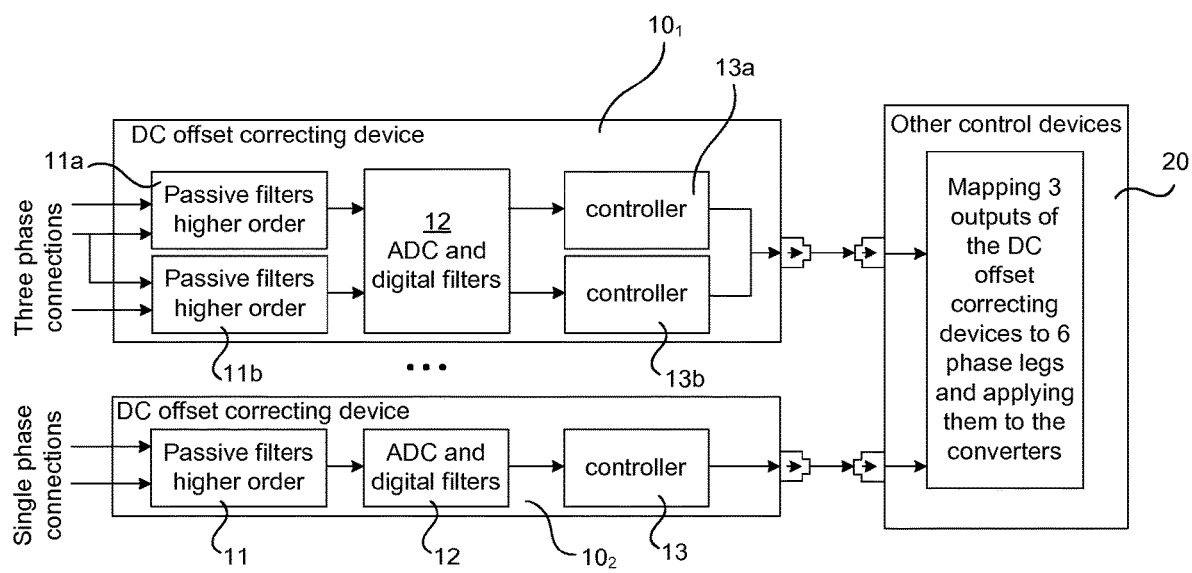
FIG. 2b is a schematic functional block diagram of an embodiment of DC offset correcting devices communicating with a control of the MMC of FIG. 2a, in accordance with the present invention.

FIG. 2b illustrates an embodiment of a DC offset correcting arrangement which may be used in the MMC example of FIG. 2a. Two DC offset correcting devices 10 are used in the arrangement, one is on the secondary side of the three phase transformer 3a and the other one on the secondary side of the single phase transformer 3b. The first DC correcting device $10_1$ is here the one connected in FIG. 2a to the three-phase output terminals, and the second DC correcting device $10_2$ is here the one connected in FIG. 2a to the single-phase output terminals.

The DC offset (mV) is filtered out from the high voltage AC (up to 36 kV) by means of the passive filters 11 and the digital filters 12, as discussed above.

The balanced voltages between upper and lower phase-legs $9_U$ and $9_L$, as well as the adjacent phase-legs together with the current controllers implemented in the MMC control 20 of the system make the DC component on the secondary side of the transformers extra low, but it may still be large enough to saturate the grid transformers 3.

It may be advantageous to measure the HV AC signals of the MMC output terminals since the signals will have the grid fundamental frequency (e.g. 50 Hz) and a minor DC offset. To filter out the DC, only one AC frequency must then be damped, giving a simpler filter design. In the example application in a double-Y topology as shown in FIG. 2b, two different passive filters 11a and 11b are designed to damp the utility grid frequency (typically 50 Hz), and the railway grid frequency (typically 16.7 Hz) is dampened in a separate DC offset correcting device.

The outputs of the controllers 13 may be transmitted via optical fibres 21 to other MMC controls 20. There, first, the outputs of the DC offset correcting devices 10 will be mapped to the phase legs 9. For instance, in the example of double-wye topology, the three outputs of the DC offset correcting devices 10 are mapped to six phase legs. The mapping is done so that the compensating DC component applied to phase legs will not be eliminated by other controller of the MMC. Second, the compensating DC component applying to the phase legs may be in a form of DC offset adding to the phase leg set points or its equivalents including modifying the firing pulses.

On each DC offset correcting device 10, there may be two independent measurement channels. For the three phase side, both channels are used to measure two signals (one is measured between phase $8_A$ and phase $8_C$ and the other is measured between phase $8_B$ and phase $8_C$). Thus, there are shown two passive filters 11a and 11b, and two controllers 13a and 13b for the three-phase correcting device $10_1$. For the single phase side, only one signal may be measured. Thus, only one channel is used. The other channel may also there but not used and not shown in the figures.

Figure 3A:
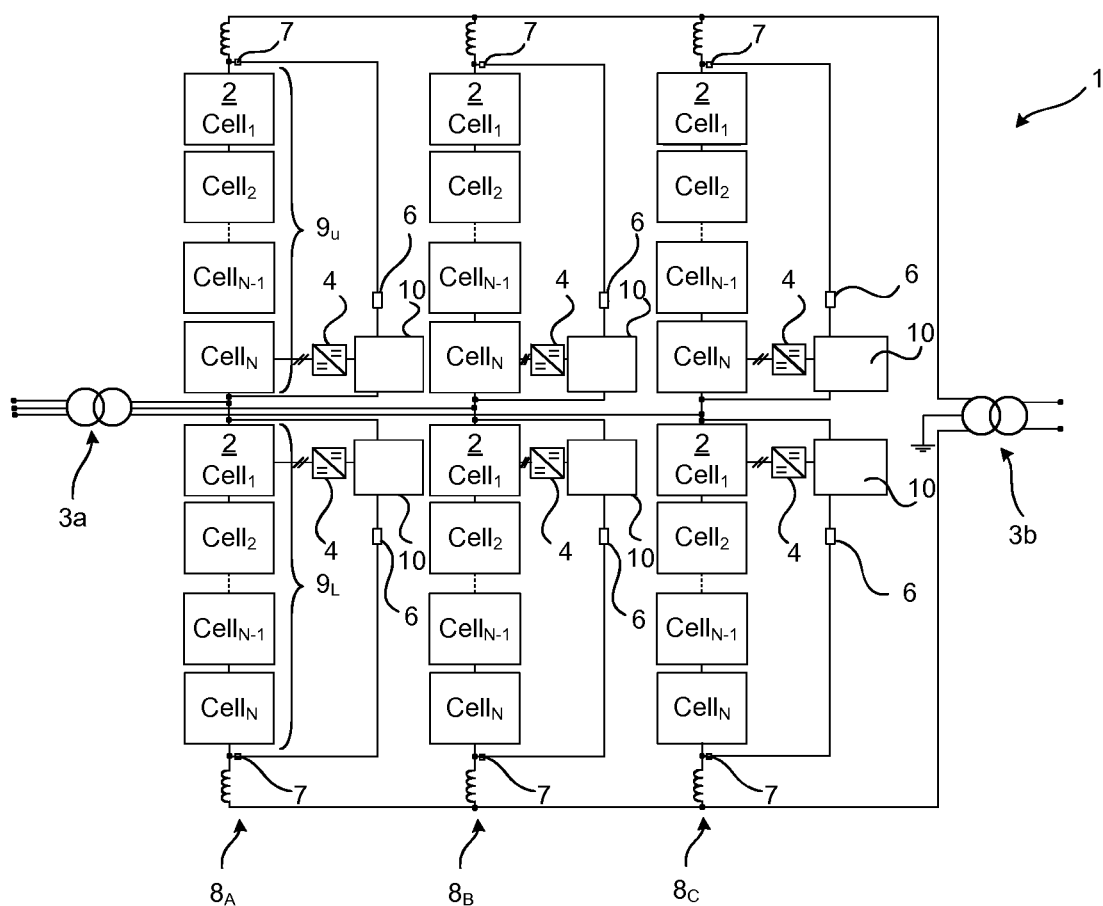
FIG. 3a is a schematic block diagram of another embodiment of an MMC comprising DC offset correcting devices, in accordance with the present invention.

FIG. 3a illustrates an embodiment of an MMC 1 in which a DC offset correcting device is connected across each phase-leg 9, instead of to the output terminals as in the embodiment of FIG. 2a.

As for the embodiment of FIG. 2a, FIG. 3a illustrates an embodiment of an MMC 1 having a double-wye topology of three phases 8 comprising phase-legs 9. Each of the phases $8_A$, $8_B$ and $8_C$ comprises an upper phase-leg $9_U$ and a lower phase-leg $9_L$, making a total of six phase-legs 9 in the MMC. Each phase leg 9 comprises a plurality of N cascaded converter cells 2, as well as a phase-leg reactor (schematically illustrated as a coils in the figure). The MMC 1 is connected between two HV AC grids via respective power transformers 3, a first grid transformer 3a connected to a first HV AC grid on its primary side and to the MMC 1 on its secondary side, and a second grid transformer 3b connected to a second HV AC grid on its primary side and to the MMC 1 on its secondary side. The first HV AC grid is in the example of FIG. 2a a three-phase grid, e.g. a utility grid (e.g. having a fundamental frequency of 50 Hz). The first HV AC grid may have a voltage above 36 kV, such as above 100 kV or above 200 kV, e.g. 220 kV. The second HV AC grid is in the example of FIG. 2a a single-phase grid, e.g. a rail grid (e.g. having a fundamental frequency of 16.7 Hz or 50/3 Hz). The second HV AC grid may have a voltage above 36 kV, such as above 100 kV, e.g. 132 kV, or above 200 kV. As mentioned above, the respective voltages on the secondary sides of the transformers 3a and 3b, i.e. the output voltages of the MMC 1, are above 3.6 kV, e.g. of at least 4 kV or at least 10 kV, up to 36 kV. It should be noted that the respective voltages on the secondary sides of the transformers 3a and 3b (i.e. the MMC output voltages towards the first and second HV AC grids, respectively) do not have to be the same, although they may be the same in some applications. Since the HV phase legs 9 are typically positioned in a valve house, the phase-legs may be connected to the outside of the valve house via bushings 7 through a wall of the valve house.

In the embodiment of FIG. 3a, DC offset correcting devices 10 are connected across each phase-leg 9 of the MMC 1, in this example resulting in a total of six DC offset correcting devices 10, via bushings 7 and voltage divider resistors 6, allowing the DC offset correcting devices 10 to obtain its respective HV AC signal from across said phase-legs. The DC offset correcting devices 10 are also in this case powered internally in the MMC, but may here be a powered via DC-to-DC converters 4 connected to an intermediate DC circuit of a converter cell 2, without necessarily needing any transformers 5 (e.g. buck transformers), for powering the DC offset correcting device to. All low voltage equipment may be mounted on an isolated platform and enough required insulation distance is given between the low voltage components and the high voltage equipment.

When measuring across the converter phase-legs, in contrast to measuring at the output terminals, the measurement input terminals of the DC offset correcting devices to are connected across the converter phase legs 9, to the phase-leg terminals. This solution provides the opportunity of using the power supplies of the converter cells. Therefore, they don't require buck type transformers 5 and AC/DC converter with high insulation. However, they may need an extra low power DC/DC power supply to isolate the ground potentials between the semiconductors gate units of the cell switches and the DC offset correcting device ground. Another point is in this embodiment there may be no need for long high voltage cables since the voltage divider resistors 6 will be distributed with the phase-legs.

Figure 3B:
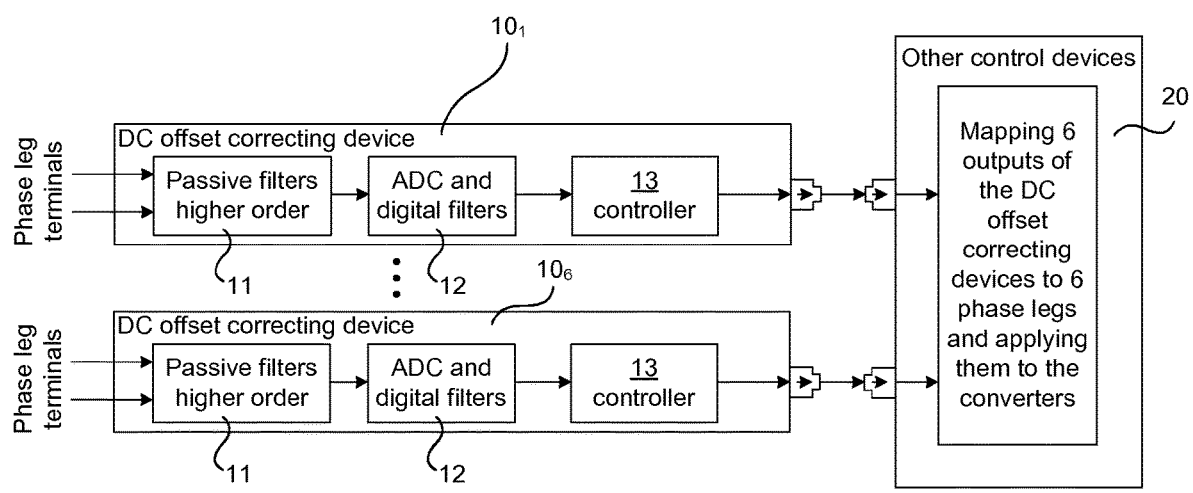
FIG. 3b is a schematic functional block diagram of an embodiment of DC offset correcting devices communicating with a control of the MMC of FIG. 3a, in accordance with the present invention.
Figure 3C:
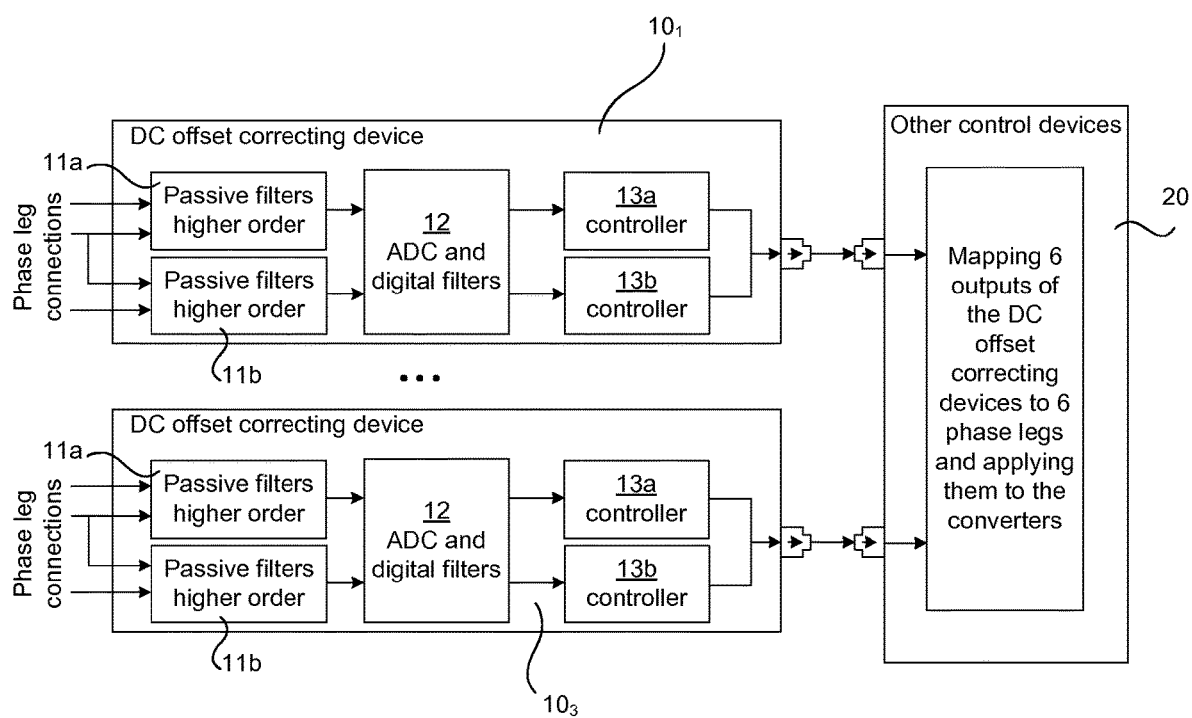
FIG. 3c is a schematic functional block diagram of another embodiment of DC offset correcting devices communicating with a control of the MMC of FIG. 3a, in accordance with the present invention.

The offset correcting devices to for the upper and lower phase legs $9_U$ and $9_L$ may be physically integrated with each other to one device with two measurement channels, as shown in FIG. 3c, or be two separate devices as shown in FIG. 3b. For the former, the DC offset devices may in this case have redundant power supplies.

Similar to the embodiment of FIGS. 2a and 2b, the DC offset component (mV) must be filtered out from the high voltage AC component (up to 36 kV). The DC component to be measured is expected to be larger than in the embodiment of FIGS. 2a and 2b. However, what is more challenging is that in this case signals to the DC offset correcting devices to may contain more than one fundamental frequency. Compared to the embodiment of FIGS. 2a and 2b, this may be a disadvantage (the filter design may be more challenging). In the example application in double-Y topology as shown in 3a, both the fundamental frequency from the thee-phase utility grid (typically 50 Hz) and the single-phase railway grid (typically 16.7 Hz) will appear in the measurements of the DC offset correcting devices 10 and both frequency components must be damped to an acceptable level with the filters 11 and 12.

The outputs of the controllers 13 may be transmitted via optical fibres 21 to the MMC control 20. There, first, the outputs of the DC offset correcting devices 10 will be mapped to the phase legs 9. In the example application in double-Y MMC topology, six outputs of the DC offset correcting devices will be mapped to six phase-legs. This is to some extend more straight-forward than that in the embodiment of FIGS. 2a and 2b, because in the embodiment of FIGS. 3a-c each phase-leg 9 has a dedicated DC offset correcting device 10. However, care is taken in the mapping mechanism so that the compensating DC component applied to phase legs will not be eliminated by other controller in the MMC. Similarly, the compensating DC component applied to the phase legs may be in a form of DC offset adding to the phase leg set points or its equivalents including modifying the firing pulses.

Embodiments of the present invention may be used with any MMC topology. However, in some embodiments of the present invention, the HV AC grid is a three-phase (e.g. utility) grid. Additionally or alternatively, in some embodiments, the MMC is also connected to a second HV AC grid via a second grid transformer 3b and/or via a line reactor. In some embodiments, the second HV AC grid is a single-phase grid (e.g. a rail grid), whereby the MMC may have a double-wye topology. In other embodiments, the second HV AC grid is a second three-phase (e.g. utility) grid.

In some embodiments of the present invention, the high-voltage AC signal is obtained from an output terminal of the MMC 1. In some embodiments, a first of the DC offset correcting devices 10 is connected to the three-phase output terminals of the MMC to the first grid transformer 3a. If the MMC is connected to a single-phase HV AC grid, a second of the DC offset correcting devices 10 may be connected to the single-phase output terminals of the MMC to the second grid transformer 3b or line reactor.

In some other embodiments, the high-voltage AC signal is obtained across a phase leg 9 of the MMC 1. In some embodiments, for each of the phase legs 9 of the MMC, one of the at least one DC offset correcting devices to is connected across said phase leg.

In some embodiments of the present invention, each of the at least one DC offset correcting device to is powered internally in the MMC 1 via a power supply. The power supply may comprise an AC-to-DC converter connected to an output terminal of the MMC 1 via a buck transformer 5, or a DC-to-DC converter connected to the intermediate DC circuit of a converter cell 2 of the MMC 1.

In some embodiments of the present invention, the control signal is transmitted from each DC offset correcting device 10 to the MMC control device 20 via optical cable(s) 21.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of compensating for a DC offset of a high-voltage AC output from a Modular Multilevel Converter, MMC, comprising at least one phase leg of at least one AC phase, wherein each of the at least one phase leg comprises a plurality of cascaded converter cells, each cell comprising a plurality of semiconductor switches and an energy storage forming an intermediate DC circuit in the cell, wherein the MMC is connected to a three-phase high-voltage AC grid via a grid transformer, the method comprising:

in at least one DC offset correcting device of the MMC, measuring the DC offset by, in each of the at least one DC offset correcting device:
        obtaining a high-voltage AC signal in the MMC;
        removing high-voltage AC components from the obtained high-voltage AC signal by means of a passive higher-order filter to obtained an analogue filtered signal;
        converting the analogue filtered signal to a digital signal by means of an analogue-to-digital converter;
        removing remaining AC components from the digital signal by means of a digital filter, whereby the AC components are sufficiently supressed to allow obtaining of the DC offset; and
        in a controller, comparing the obtained offset with a reference value and forming a control signal based on said comparing;
    transmitting the control signal from each of the at least one DC offset correcting device to a control device of the MMC;
    the control device mapping the control signal(s) from the at least one DC offset correcting device to the at least one phase leg; and
    based on the mapping, the control device sending switching commands to the semiconductor switches of the cells in each of the at least one phase leg to compensate for the DC offset.

2. The method of claim 1, wherein the high-voltage AC grid is a three-phase grid and wherein the MMC is also connected to a second high-voltage AC grid via a second grid transformer and/or a line reactor.

3. The method of claim 2, wherein the second high-voltage AC grid is a single-phase grid, whereby the MMC has a double-wye topology.

4. The method of claim 3, wherein the high-voltage AC signal is obtained from an output terminal of the MMC.

5. The method of claim 3, wherein the high-voltage AC signal is obtained across a phase leg of the MMC.

6. The method of claim 3, wherein each of the at least one DC offset correcting device is powered internally in the MMC via a power supply.

7. The method of claim 2, wherein the high-voltage AC signal is obtained from an output terminal of the MMC.

8. The method of claim 2, wherein the high-voltage AC signal is obtained across a phase leg of the MMC.

9. The method of claim 2, wherein each of the at least one DC offset correcting device is powered internally in the MMC via a power supply.

10. The method of claim 1, wherein the high-voltage AC signal is obtained from an output terminal of the MMC.

11. The method of claim 10, wherein a first of the at least one DC offset correcting device is connected to the three-phase output terminals of the MMC to the first grid transformer.

12. The method of claim 11, wherein each of the at least one DC offset correcting device is powered internally in the MMC via a power supply.

13. The method of claim 10, wherein each of the at least one DC offset correcting device is powered internally in the MMC via a power supply.

14. The method of claim 1, wherein the high-voltage AC signal is obtained across a phase leg of the MMC.

15. The method of claim 14, wherein, for each of the phase legs of the MMC, one of the at least one DC offset correcting device is connected across said phase leg.

16. The method of claim 1, wherein each of the at least one DC offset correcting device is powered internally in the MMC via a power supply.

17. The method of claim 16, wherein the power supply comprises an AC-to-DC converter connected to an output terminal of the MMC via a buck transformer.

18. The method of claim 16, wherein the power supply comprises a DC-to-DC converter connected to the intermediate DC circuit of a cell of the MMC.

19. The method of claim 1, wherein the control signal is transmitted via optical cable(s).

20. A Modular Multilevel Converter, MMC, comprising at least one phase leg of at least one AC phase, wherein each of the at least one phase leg comprises a plurality of cascaded converter cells, each cell comprising a plurality of semiconductor switches and an energy storage forming an intermediate DC circuit in the cell, wherein the MMC is connected to a three-phase high-voltage AC grid via a grid transformer, the MMC comprising:

at least one DC offset correcting device configured for measuring the DC offset by, in each of the at least one DC offset correcting device:
        obtaining a high-voltage AC signal in the MMC;
        removing high-voltage AC components from the obtained high-voltage AC signal by means of a passive higher-order filter to obtained an analogue filtered signal;
        converting the analogue filtered signal to a digital signal by means of an analogue-to-digital converter;
        removing remaining AC components from the digital signal by means of a digital filter, whereby the AC components are sufficiently supressed to allow obtaining of the DC offset;
        in a controller, comparing the obtained offset with a reference value and forming a control signal based on said comparing; and
    transmitting the control signal from each of the at least one DC offset correcting device to a control device of the MMC; and
    a control device configured for mapping the control signal(s) from the at least one DC offset correcting device to the at least one phase leg, and based on the mapping, sending switching commands to the semiconductor switches of the cells in each of the at least one phase leg to compensate for the DC offset.

* * * * *